(12) United States Patent
Cochran

(10) Patent No.: US 6,358,394 B1
(45) Date of Patent: Mar. 19, 2002

(54) APPARATUS AND METHOD FOR MANUFACTURING FLUID DYNAMIC BEARINGS

(75) Inventor: Dustin A. Cochran, Scotts Valley, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/438,826

(22) Filed: Nov. 12, 1999

Related U.S. Application Data

(60) Provisional application No. 60/133,184, filed on May 7, 1999.

(51) Int. Cl.[7] .................................................. C25F 3/00
(52) U.S. Cl. ............. 205/640; 204/224 M; 204/290.01; 204/272
(58) Field of Search .................................. 204/272, 280, 204/290.01, 224 M, 286; 205/640

(56) References Cited

U.S. PATENT DOCUMENTS

| | | | | |
|---|---|---|---|---|
| 4,690,737 A | * | 9/1987 | Vishnitsky | 204/129.7 |
| 5,758,421 A | * | 6/1998 | Asada | 29/898.02 |
| 5,878,495 A | * | 3/1999 | Martens et al. | 29/898.057 |
| 5,914,832 A | * | 6/1999 | Teshima | 360/98.07 |

* cited by examiner

Primary Examiner—Kathryn Gorgos
Assistant Examiner—Thomas H Parsons
(74) Attorney, Agent, or Firm—Moser, Patterson & Sheridan LLP

(57) ABSTRACT

An apparatus 245 and method are provided for electrochemically etching grooves 235 in an inner surface 215 of a hub 160 to form at least one fluid dynamic bearing. The apparatus 245 includes a cathode 250 having an electrically conductive substrate 270 with an outer surface 275 that corresponds to the inner surface 215 of the hub 160. The outer surface 275 has raised lands 280 corresponding to areas in which the grooves 235 are to be formed in the inner surface 215 of the hub 160. A layer of electrically insulating material 285 covers the outer surface 275 of the substrate 270 between the raised lands 280 to reduce etching of the inner surface 215 of the hub 160 in corresponding areas.

19 Claims, 5 Drawing Sheets

APPARATUS AND METHOD FOR MANUFACTURING FLUID DYNAMIC BEARINGS

CROSS REFERENCE TO RELATED APPLICATIONS

This application claims priority from U.S. Provisional Patent Application Ser. No. 60/133,184 filed May 7, 1999.

BACKGROUND OF THE INVENTION

1. Field of the Invention

This invention pertains generally to the field of fluid dynamic bearings, and more particularly to etching grooves in a hub used in a spindle motor of a disc drive to form such bearings.

2. Description of Related Art

Disc drives, including magnetic disc drives, optical disc drives and magneto-optical disc drives, are widely used for storing information. A typical disc drive has one or more discs or platters which are affixed to a spindle and rotated at high speed past a read/write head suspended above the discs on an actuator arm. The spindle is turned by a spindle drive motor. The motor generally includes a shaft having a thrust plate on one end, and a rotating hub having a sleeve and a recess into which the shaft with the thrust plate is inserted. Magnets on the hub interact with a stator to cause rotation of the hub relative to the shaft.

In the past, conventional spindle motors frequently used conventional ball bearings between the hub and the shaft and the thrust plate. However, over the years the demand for increased storage capacity and smaller disc drives has led to the read/write head being placed increasingly close to the disc. Currently, read/write heads are often suspended no more than a few millionths of an inch above the disc. This proximity requires that the disc rotate substantially in a single plane. Even a slight wobble or run-out in disc rotation can cause the disc to strike the read/write head, damaging the disc drive and resulting in loss of data. Because this rotational accuracy cannot be achieved using ball bearings, the latest generation of disc drives utilize a spindle motor having fluid dynamic bearings on the shaft and the thrust-plate.

In a fluid dynamic bearing, a lubricating fluid such as gas or a liquid or air provides a bearing surface between a fixed member and a rotating member of the disc drive. Dynamic pressure-generating groove formed on a surface of the fixed member or the rotating member generates a localized area of high pressure or a dynamic cushion that enables the spindle to rotate with a high degree of accuracy. Typical lubricants include oil and ferromagnetic fluids. Fluid dynamic bearings spread the bearing interface over a large continuous surface area in comparison with a ball bearing assembly, which comprises a series of point interfaces. This is desirable because the increased bearing surface reduces wobble or run-out between the rotating and fixed members. Further, improved shock resistance and ruggedness is achieved with a fluid dynamic bearing. Also, the use of fluid in the interface area imparts damping effects to the bearing which helps to reduce non-repeat runout.

One generally known method for producing the dynamic pressure-generating grooves is described in U.S. Pat. No. 5,758,421, to Asada, (ASADA), hereby incorporated by reference. ASADA teaches a method of forming grooves by pressing and rolling a ball over the surface of a workpiece to form a groove therein. The diameter of the ball is typically about 1 mm, and it is made of a material such as carbide which is harder than that of the workpiece. This approach and the resulting fluid dynamic bearing, while a tremendous improvement over spindle motors using a ball bearing, is not completely satisfactory. One problem with the above method is the displacement of material in the workpiece, resulting in ridges or spikes, along the edges of the grooves. Removing these ridges, for example by polishing or deburring, is often a time consuming and therefore a costly process. Moreover, to avoid lowering yields great care must be taken not to damage the surface of the workpiece.

A further problem with the above method is due to a recent trend in disc drives toward higher rotational speeds to reduce access time, that is the time it takes to read or write data to a particular point on the disc. Disc drives now commonly rotate at speeds in excess of 7,000 revolutions per minute. These higher speeds require the shaft and the hub to be made of harder material. Whereas, in the past one or more of the shaft, the sleeve or the hub could be made of a softer material, for example brass or aluminum, now all of the components must frequently be made out of a harder metal such as, for example, steel, stainless steel or an alloy thereof. These metals are as hard or harder than the material of the ball. Thus, the above method simply will not work to manufacture fluid dynamic bearings for the latest generation of disc drives.

Another method for producing the grooves of a fluid dynamic bearing is described in U.S. Pat. No. 5,878,495, to Martens et al. (MARTENS), hereby incorporated by reference. MARTENS teach a method of forming dynamic pressure-generating grooves using an apparatus, such as a lathe, having a metal-removing tool and a fixture that moves the workpiece incrementally in the direction in which a pattern of grooves is to be formed. The metal-removing tool forms the grooves by carrying out a short chiseling movement each time the workpiece is moved. This approach, while an improvement over the earlier one in that it does not produce ridges that must be removed, is also not completely satisfactory. For one thing, this approach like that taught by ASADA is typically not suitable for use with harder metals, which in addition to being more difficult to machine are often brittle and can be damaged by the chiseling action. Moreover, because each groove or portion of a groove must be individually formed and the workpiece then moved, the process tends to be very time consuming and therefore costly. Furthermore, the equipment necessary for this approach is itself expensive and the metal-removing tool is subject to wear and requires frequent replacement.

A final method for producing the grooves involves a conventional etching process as described in U.S. Pat. No. 5,914,832, to Teshima (TESHIMA), hereby incorporated by reference. TESHIMA teaches a process in which the workpiece is covered with a patterned etch resistant coating prior to etching so that only the exposed portions of the workpiece are etched. While this approach avoids many of the problems of the previously described methods, namely the formation of ridges around the grooves and the inability to form grooves in hard metal, it creates other problems and therefore is also not wholly satisfactory. One problem is the time consumed in applying and patterning the etch resistant coat. This is particularly a problem where, as in TESHIMA, the resist coat must be baked prior to patterning or etching. Another problem is that the coating must be removed after etching. This is frequently a difficult task, and one that if not done correctly can leave resist material on the workpiece surface resulting in the failure of the bearing and destruction of the disc drive. Yet another problem with this approach is that each of the steps of the process requires the extensive use of environmentally hazardous and often toxic chemicals including photoresists, developers, solvents and strong acids.

Accordingly, there is a need for an apparatus and method for forming grooves in a workpiece made of a hard metal to manufacture fluid dynamic bearings suitable for use in a disc drive. It is desirable that the apparatus and method that allows the grooves to formed quickly and cheaply. It is also desirable that the apparatus and method not require expensive equipment or the use of a metal-removing tool that must be frequently replaced. It is further desirable that the apparatus and method not use an etch resistant material during manufacture that could contaminate the workpiece leading to the failure of the bearing and destruction of the disc drive.

The present invention provides a solution to these and other problems, and offers other advantages over the prior art.

SUMMARY OF THE INVENTION

The present invention relates to a method and apparatus for electrochemically etching grooves in an inner surface of a hub to form a fluid dynamic bearing that solves these problems.

In accordance with one embodiment, a cathode is provided having an electrically conductive substrate with an outer surface that corresponds to the inner surface of the hub, the outer surface including raised lands that correspond to the grooves to be formed in the inner surface of the hub. The substrate can be made of aluminum, brass, chromium, copper, nickel, steel, stainless steel, tin, zinc or alloys thereof. Preferably, the substrate is stainless steel. More preferably, the stainless steel is T-303 stainless steel or T-316 stainless steel. A layer of electrically insulating material covers the outer surface of the substrate between the raised lands to substantially preclude etching of the inner surface of the hub in areas corresponding to areas between the raised lands. Preferably, the layer of electrically insulating material includes an organic polymer bonded to the outer surface of the substrate. More preferably, the organic polymer comprises an adhesive, such as an epoxy resin. In one version of this embodiment, the inner surface of the hub comprises a cylindrical sleeve extending through the hub and a counterbored thrustplate cavity concentric with the sleeve. Preferably, the raised lands are arranged on the outer surface of the substrate to simultaneously etch grooves in the sleeve and the thrustplate cavity. Preferably, the raised lands are arranged on the outer surface of the substrate to form a fluid dynamic thrust bearing in the thrustplate cavity and at least one fluid dynamic journal bearing in the sleeve. The raised lands can be shaped and arranged on the outer surface of the substrate to etch a herringbone, an arcuate or a sinusoidal pattern of grooves in the inner surface of the hub.

In another aspect, the present invention is directed to a process of electrochemically etching grooves in an inner surface of an electrically conductive hub. The inner surface generally includes a cylindrical sleeve extending through the hub and a counterbored thrustplate cavity concentric with the sleeve. In the process, the hub and a cathode are held with a fixture adapted to hold the cathode within the hub so that there is substantially no contact between the cathode and the inner surface of the hub. An electrolyte is then allowed to flow between the cathode and the hub. The electrolyte can include one or more of water, a dilute acid, $NaNO_3$ or mixtures thereof. Next, the cathode and the hub are coupled to an electrical current supply so that an electrical current is passed between the cathode and the hub to remove material from the inner surface of the hub. This can be accomplished, for example, by coupling the cathode to a negative terminal of the electrical current supply and coupling the hub to the positive terminal. Preferably, at least 10 $A/cm^2$ is passed between the raised lands and areas of the thrustplate juxtaposed thereto. More preferably, less than 0.1 $A/cm^2$ is passed between the electrically insulating layer and areas of the thrustplate juxtaposed thereto. In another preferred embodiment, grooves are etched simultaneously in the sleeve and in the thrustplate cavity. More preferably, the grooves are etched to simultaneously form a fluid dynamic thrust bearing in the thrustplate cavity and at least one fluid dynamic journal bearing in the sleeve.

In yet another aspect, the present invention is directed to an apparatus for electrochemically etching grooves in an inner surface of an electrically conductive hub. The inner surface generally has a cylindrical sleeve extending through the hub and a counterbored thrustplate cavity concentric with the sleeve. The apparatus includes a cathode having an electrically conductive substrate with an outer surface that corresponds to the inner surface of the hub. The outer surface includes a number of raised lands and a layer of electrically insulating material between the raised lands. A fixture holds the cathode with the hub so that there is substantially no contact between the cathode and the inner surface of the hub. Generally, the fixture comprises an electrically insulating body. A sealed electrolyte flowpath is provided to flow an electrolyte between the cathode and the hub. The flow-path can be adapted to flow a sufficient volume of electrolyte to remove material etched from the hub. An electrical current supply passes electrical current between the cathode and the hub so that material is removed from the inner surface of the hub in areas corresponding to the raised lands. In one preferred embodiment, the raised lands are arranged on the outer surface of the substrate to simultaneously etch grooves in the sleeve and in the thrustplate cavity. More preferably, the raised lands are arranged to form a fluid dynamic thrust bearing in the thrustplate cavity and at least one fluid dynamic journal bearing in the sleeve.

In still another aspect, the present invention is directed to an apparatus having a means for electrochemically etching grooves in the hub by passing electrical current through the electrolyte and the hub so that material is removed from the inner surface of the hub. In one version, the means for electrochemically etching grooves includes an electrically conductive substrate having an outer surface that corresponds to the inner surface of the hub. Preferably, the outer surface includes conducting means for passing electrical current from the substrate through the electrolyte to the hub, the conducting means juxtaposed to areas of the inner surface of the hub in which the grooves are to be formed. More preferably, the outer surface has an electrically insulating means for substantially preventing electrical current from passing from the substrate through the electrolyte to the inner surface of the hub in areas other than those in which the grooves are to be formed.

These and various other features as well as advantages which characterize the present invention will be apparent upon reading of the following detailed description and review of the associated drawings.

DETAILED DESCRIPTION OF THE INVENTION

Figure 1:
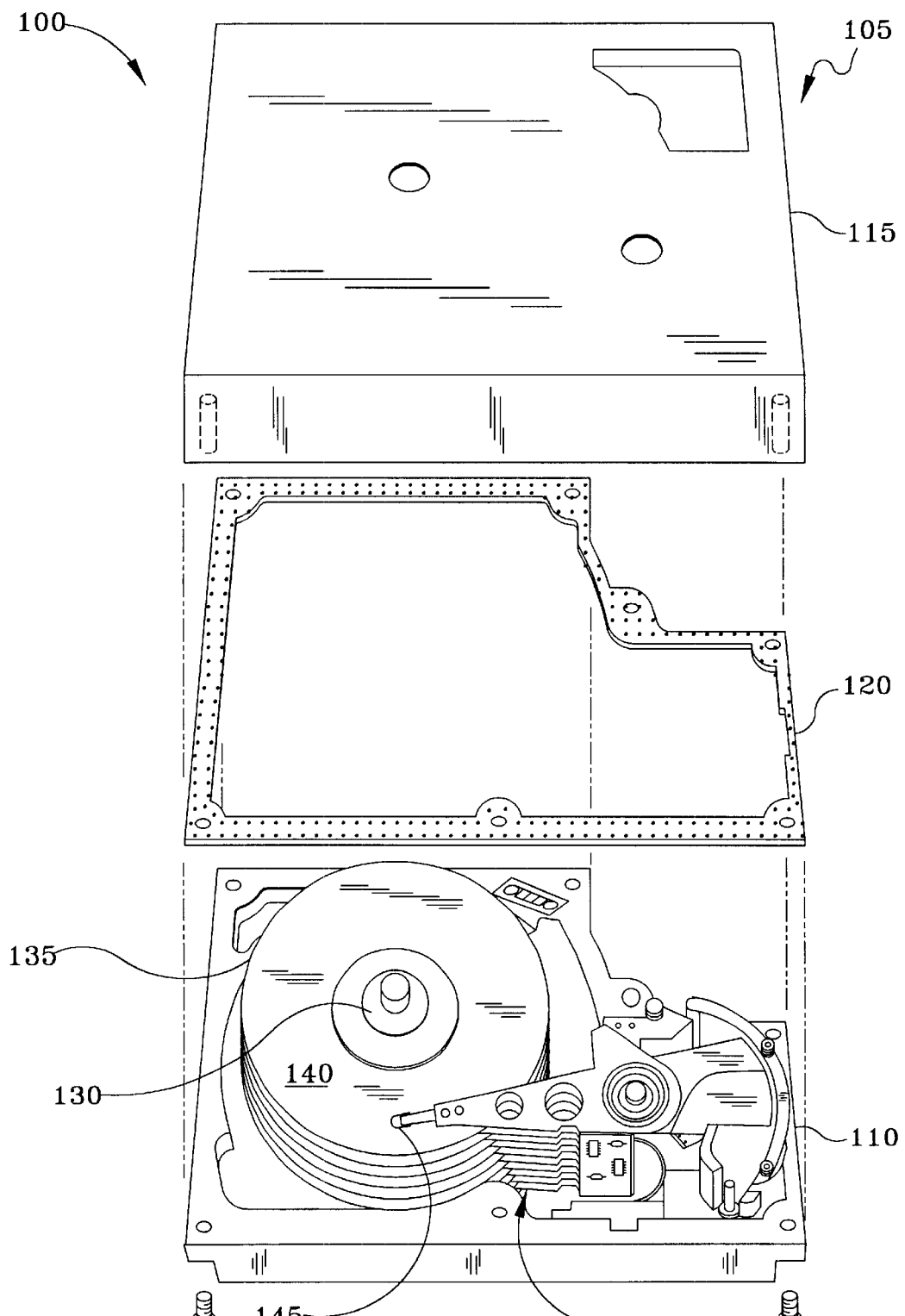
FIG. 1 (prior art) is an exploded perspective view of the basic elements of a disc drive in which a motor incorporating the present invention is especially useful.

FIG. 1 is an exploded perspective view of a magnetic disc drive for which a spindle motor having a fluid dynamic bearing manufactured by the method and apparatus for the present invention is particularly useful. Referring to FIG. 1, a disc drive 100 typically includes a housing 105 having a base 110 sealed to a cover 115 by a seal 120. The disc drive 100 has a spindle 130 to which are attached a number of discs 135 having surfaces 140 covered with a magnetic media (not shown) for magnetically storing information. A spindle motor (not shown in this figure) rotates the discs 135 past read/write heads 145 which are suspended above surfaces 140 of the discs by a suspension arm assembly 150. In operation, the spindle motor rotates the discs 135 at high speed past the read/write heads 145 while the suspension arm assembly 150 moves and positions the read/write heads over one of several radially spaced tracks (not shown). This allows the read/write heads 145 to read and write magnetically encoded information to the magnetic media on the surfaces 140 of the discs 135 at selected locations.

Figure 2:
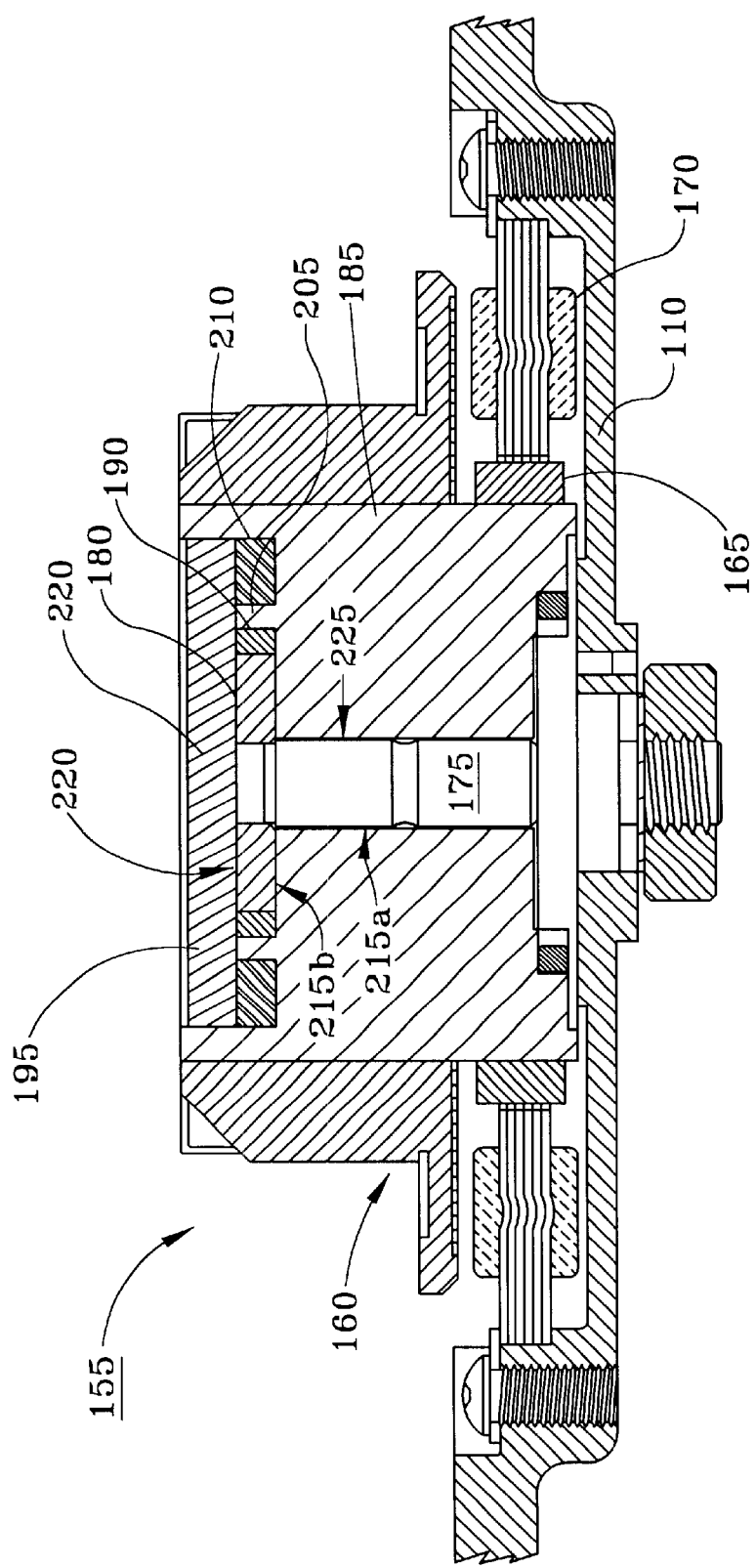
FIG. 2 is a sectional side view of a motor incorporating a hub having fluid dynamic bearings manufactured according to an embodiment of the process of the present invention.

FIG. 2 is a sectional side view of a spindle motor 155 of a type which is especially useful in disc drives 100. Typically the spindle motor 155 includes a rotatable hub 160 having one or more magnets 165 attached to a periphery thereof. The magnets 165 interact with a stator winding 170 attached to the base 110 to cause the hub 160 to rotate. The hub 160 is supported on a shaft 175 having a thrustplate 180 on one end. The thrustplate 180 can be an integral part of the shaft 175, or it can be a separate piece which is attached to the shaft, for example, by a press fit. The shaft 175 and the thrustplate 180 fit into a sleeve 185 and a thrustplate cavity 190 in the hub 160. A counter plate 195 is provided above the thrustplate 180 resting on an annular ring 205 that extends from the hub 160. An O-ring 210 seals the counter plate 195 to the hub 160.

A fluid, such as lubricating oil or a ferromagnetic fluid, fills interfacial regions between the shaft 175 and the sleeve 185, and between the thrustplate 180 and the thrustplate cavity 190 and the counter plate 195. One or more of the thrustplate 180, the thrustplate cavity 190, the shaft 175, the sleeve 185 or the counter plate 195 have pressure generating grooves (not shown in this figure) formed in accordance with the present invention to create fluid dynamic bearings. Preferably, the grooves are formed in inner surfaces 215 of the hub 160. More preferably, the grooves are formed in the sleeve 185 and in the thrustplate cavity 190. The grooves in the thrustplate cavity 190 form a fluid dynamic thrust bearing 220 by generating a localized region of dynamic high pressure to form a dynamic cushion that rotatably supports the hub 160 in the direction of thrust. Grooves in the inner surface 215a of the sleeve 185 form one or more fluid dynamic journal bearings 225 having dynamic cushions that rotatably support the hub 160 in a radial direction.

Figure 3:
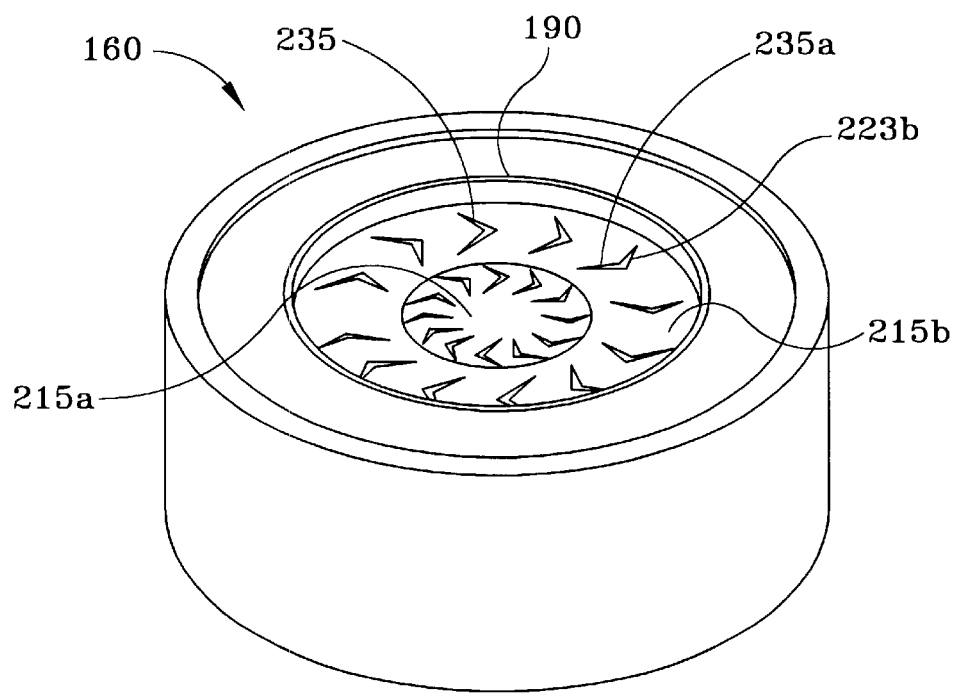
FIG. 3 is a perspective view of an embodiment of a hub having an inner surface with grooves etched therein by an embodiment of an apparatus and a method of the present invention.
Figure 4:
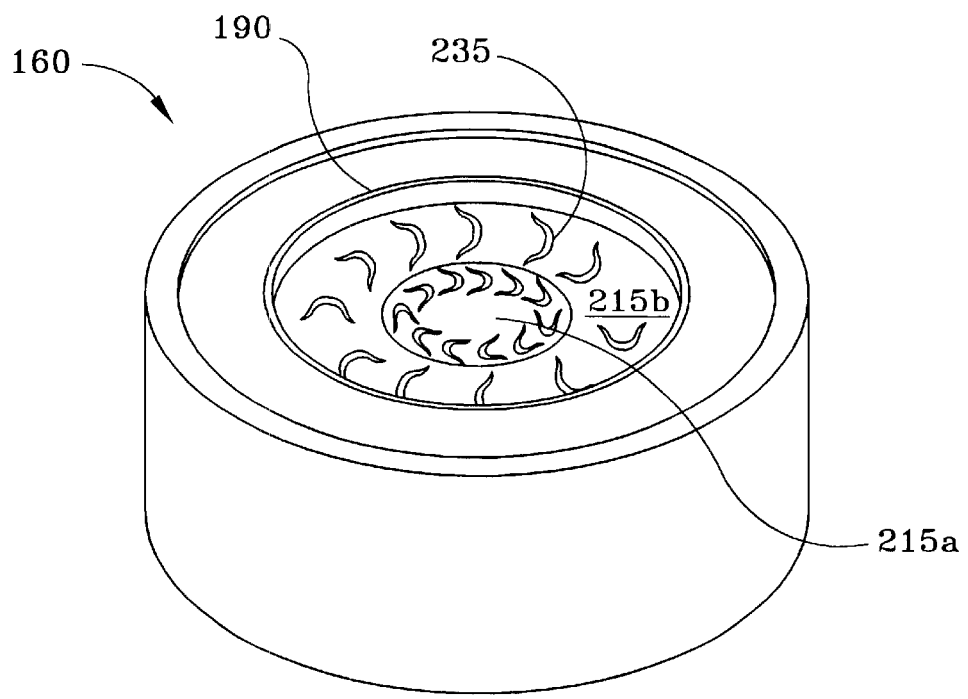
FIG. 4 is a perspective view of another embodiment of a hub having an inner surface with grooves etched therein by an embodiment of an apparatus and a method of the present invention.

The pressure generating grooves 235 formed in the sleeve 175 and the thrustplate cavity 190 will now be described with reference to FIG. 3 and FIG. 4. Fluid dynamic bearings, as previously implied, are generally formed between a rotatable and non-rotatable members having juxtaposed surfaces between which a layer or film of fluid is induced to form a dynamic cushion as an anti-friction medium. To form the dynamic cushion, at least one of the surfaces is provided with grooves 235 which induce fluid-flow in the interfacial region and generate the localized region of dynamic high pressure referred to previously. The grooves 235 which are separated by ribs or raised lands, can have a depth of from about 0.009 to 0.015 mm. Generally, the grooves 235 are shaped and arranged to form a chevron or herringbone pattern. That is, the grooves 235 are made up of two strait segments 235a, 223b, which meet at an angle to define a V shape as shown in FIG. 3. Alternatively, the grooves 235 define a pattern which has an arcuate or sinusoidal shape as shown in FIG. 4. To form a fluid dynamic journal bearing 225, the grooves 235 are configured to define a ring about the juxtaposed cylindrical surfaces of the shaft 175 and the sleeve 185. To form a fluid dynamic thrust bearing 220, the grooves 235 are configured to define an annular pattern in the inner surface 215b of the thrustplate cavity 190. Alternatively, to form a fluid dynamic thrust bearing 220, the grooves 235 can be shaped and arranged to form one or more spiral grooves (not shown).

Figure 5:
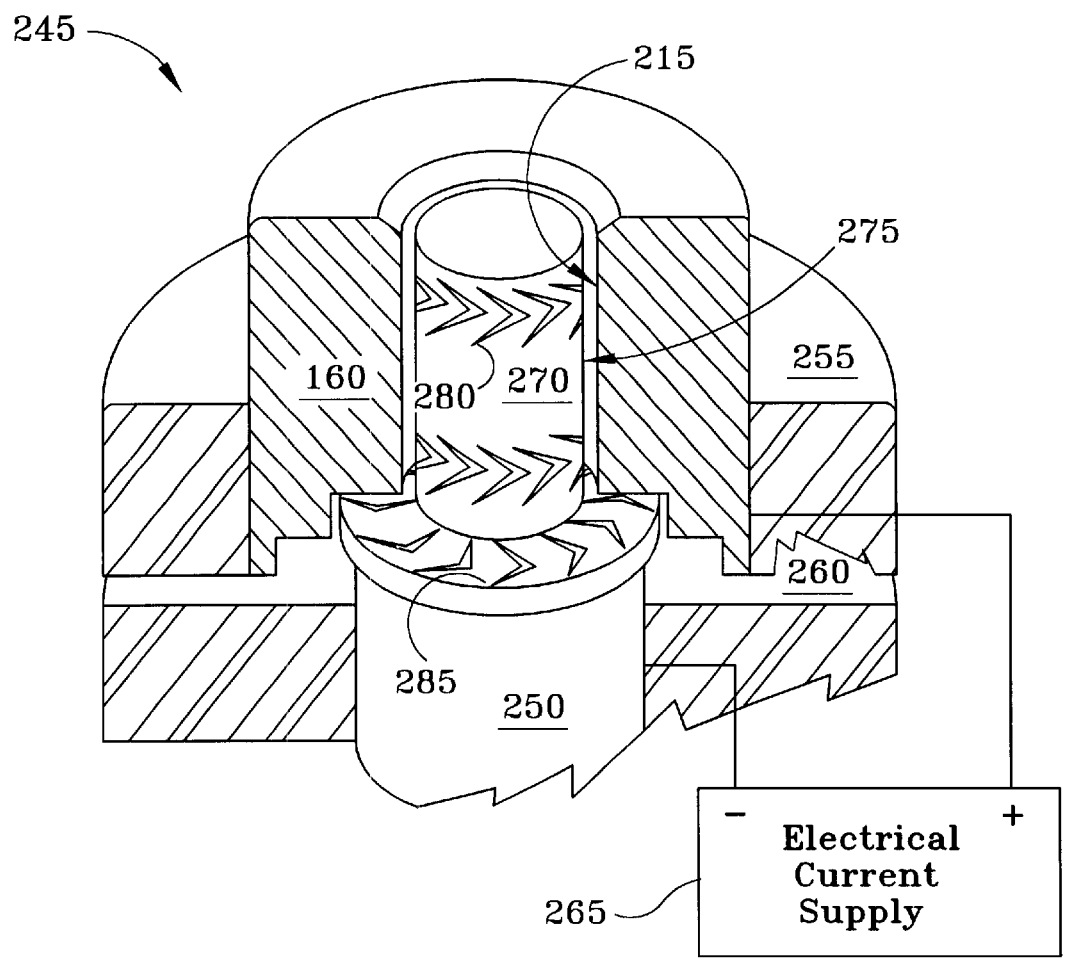
FIG. 5 is a sectional perspective view of an embodiment of an apparatus for etching grooves in an inner surface of a hub to form a fluid dynamic bearing according to the present invention.

An apparatus 245 for forming grooves 235 in the inner surface 215 of the hub 160 in accordance with present invention will now be described with respect to FIG. 5. The apparatus 245 generally includes a cathode 250, an electrically insulating body or fixture 255 adapted to hold the cathode within the hub 160 so that there is substantially no contact between the cathode and the inner surface 215 of the hub, a sealed electrolyte flow-path 260 adapted to flow an electrolyte between the cathode and the hub, and an electrical current supply 265 coupled to the cathode and the hub. An electrical current is passed between the cathode 250 and the hub 160 through the electrolyte to electrochemically machine or etch the inner surface 215 of the hub.

The cathode 250 has an electrically conductive substrate 270 with an outer surface 275 that corresponds to the inner surface 215 of the hub 160. The outer surface 275 has one or more raised lands 280 and a layer of electrically insulating material 285 between the raised lands. The raised lands 280 are arranged and oriented to remove material from the inner surfaces 215 of the hub 160 in areas in which grooves 235 are desired to be formed. In the embodiment shown in FIG. 5, the raised lands 280 are arranged on the outer surface 275 of the substrate 270 to simultaneously etch grooves 235 in the sleeve 185 and in the thrustplate cavity 190. The substrate 270 can be made of aluminum, brass, chromium, copper, nickel, steel, stainless steel, tin, zinc or alloys thereof. Preferably, the substrate 270 is made of stainless steel to resist chemical attack and erosion by the electrolyte, and more preferably, the stainless steel is T-303 stainless steel or T-316 stainless steel.

The layer of electrically insulating material 285 prevents electrical current from passing between the substrate 270 and the inner surface 215 of the hub 160 in areas other than those in which the grooves 235 are to be formed. Thus, reducing or substantially precluding etching of the inner surface 215 of the hub 160 in areas corresponding to areas between the raised lands 280. In the embodiment shown in FIG. 5, the electrically insulating material 285 includes a layer sufficiently thick to provide a substantially smooth surface with the raised lands 280. This reduces the erosion of the raised lands 280 which would otherwise be caused by the flow of electrolyte, thereby extending the life of the cathode 250. In one embodiment, the layer of electrically insulating material 285 is made from an organic polymer. Preferably, the organic polymer includes an adhesive to bond to the outer surface of the substrate 270, and more preferably, the organic polymer includes an epoxy resin, such as Ablebond® 400-5 or Ablebond® 293-1T.

Figure 6:
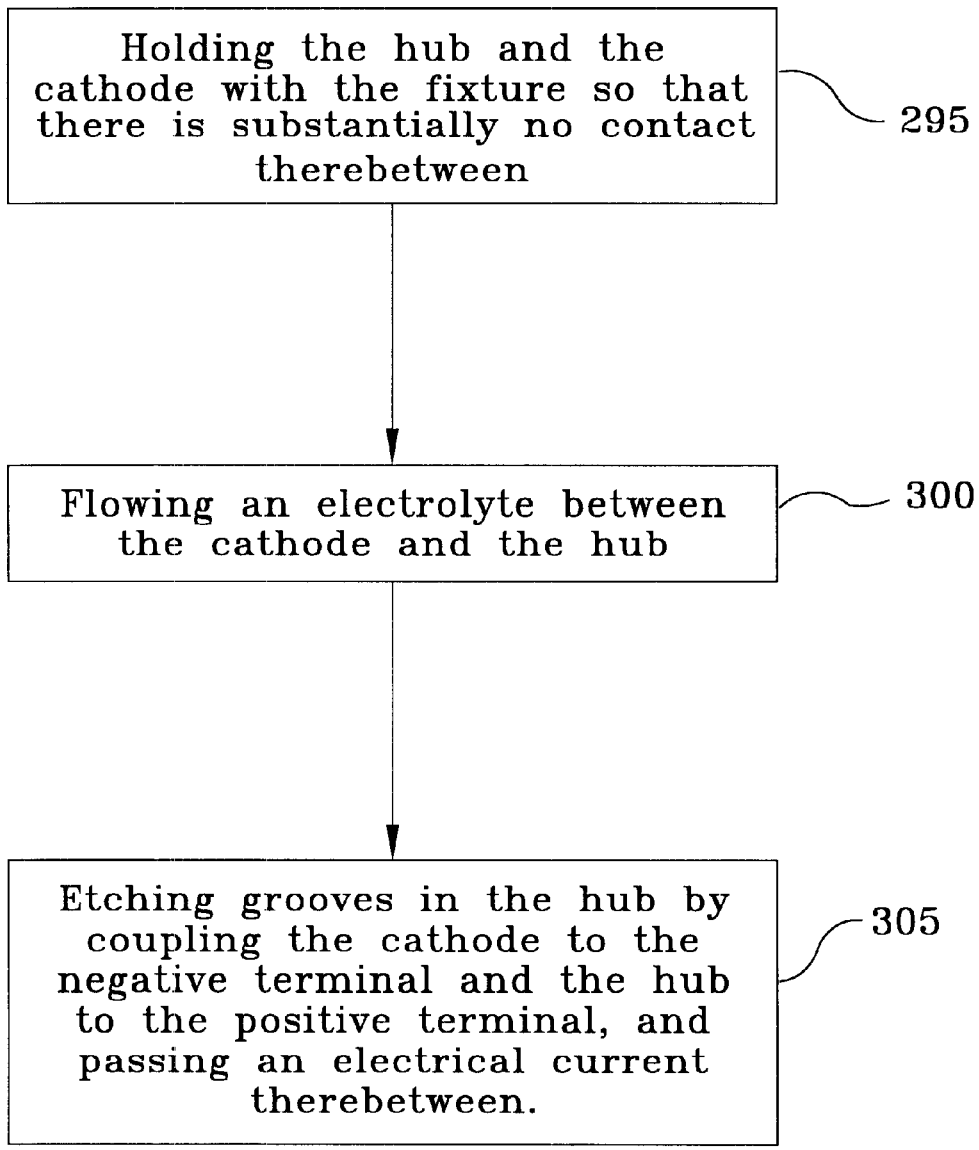
FIG. 6 is a flowchart showing a preferred process for electrochemically etching grooves in an inner surface of a hub to form a fluid dynamic bearing.

A process of forming grooves 235 in the inner surface 215 of the hub 160 using the above apparatus 245 will now be described with reference to FIG. 6. FIG. 6 is a flowchart showing a process for electrochemically etching grooves 235 in the inner surface 215 of the hub 160 according to the present invention. In a setup step 295, the hub 160 and the cathode 250 are held by the fixture 255 so that there is substantially no contact between the cathode 250 and the hub 160. An electrolyte is then allowed to flow between the cathode 250 and the hub 160 (step 300). The electrolyte is selected depending on the materials of the cathode 250 and the hub 160, and can include one or more of water, a dilute acid or $NaNO_3$. Next, in an etch step 305 the cathode 250 is coupled to the negative terminal of the electrical current supply 265 and the hub 160 is coupled to the positive terminal so that an electrical current is passed between the cathode and the hub. As electrons migrate from the inner surface 215 of the hub 160 to the cathode 250, metal atoms at the inner surface of the hub are ionized, breaking metallic bonds and allowing these atoms to be flushed or carried away by the electrolyte. Because of the proximity of the raised lands 280 to the inner surface 215 of the hub 160, substantially all of the electrical current flow, and consequently substantially all of the etching, occurs at the portions of the inner surface 215 of the hub immediately adjacent or juxtaposed to the raised lands. Generally, at least 10 $A/cm^2$ is passed between the raised lands 280 and areas of the hub 160 juxtaposed thereto, and less than 0.1 $A/cm^2$ is passed between the electrically insulating layer 285 and areas of the hub juxtaposed thereto. Thus, grooves 235 are formed in the sleeve 185 or in the thrustplate cavity 190, which are shaped and arranged to correspond to the raised lands 280. In one preferred embodiment, grooves 235 are etched simultaneously in the sleeve 185 and in the thrustplate cavity 195.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, although the preferred embodiment described herein is directed to an apparatus and method of electrochemically etching grooves to form fluid dynamic bearings for use in a disc drive, it will be appreciated by those skilled in the art that the teachings of the present invention can be applied to other devices using fluid dynamic bearings, without departing from the scope and spirit of the present invention.

What is claimed is:

1. A cathode for electrochemically etching grooves in an inner surface of a hub to form at least one fluid dynamic bearing, the cathode comprising:
    (a) an electrically conductive substrate having an outer surface that corresponds to the inner surface of the hub, the outer surface comprising a plurality of raised lands corresponding to the grooves to be formed in the inner surface of the hub; and
    (b) a layer of electrically insulating material covering the outer surface of the substrate between the plurality of raised lands to substantially preclude etching of the inner surface of the hub in areas corresponding to areas between the plurality of raised lands; wherein the plurality of raised lands are arranged on the outer surface of the substrate to simultaneously etch grooves in the sleeve and the thrustplate cavity.

2. A cathode according to claim 1, wherein the plurality of raised lands are shaped and arranged on the outer surface of the substrate to etch a pattern of grooves in the inner surface of the hub, and wherein the pattern is a herringbone pattern or an arcuate pattern.

3. A cathode according to claim 1, wherein the layer of electrically insulating material comprises an organic polymer bonded to the outer surface of the substrate.

4. A cathode according to claim 1, wherein substrate comprises stainless steel or brass.

5. A cathode for electrochemically etching grooves in an inner surface of a hub to form at least one fluid dynamic bearing, the cathode comprising:
    (a) an electrically conductive substrate having an outer surface that corresponds to the inner surface of the hub, the outer surface comprising a plurality of raised lands corresponding to the grooves to be formed in the inner surface of the hub; and
    (b) a layer of electrically insulating material covering the outer surface of the substrate between the plurality of raised lands to substantially preclude etching of the inner surface of the hub in areas corresponding to areas between the plurality of raised lands, wherein the inner surface of the hub comprises a cylindrical sleeve extending through the hub and a counterbored thrustplate cavity concentric with the sleeve and the insulation is substantially the height of the raised lands.

6. A cathode according to claim 5, wherein the plurality of raised lands are arranged on the outer surface of the substrate to form a fluid dynamic thrust bearing in the thrustplate cavity and at least one fluid dynamic journal bearing in the sleeve.

7. A method of electrochemically etching grooves in an inner surface of an electrically conductive hub, the inner surface having a cylindrical sleeve extending through the hub and a counterbored thrustplate cavity concentric with the sleeve, the method comprising steps of:
    (a) providing a cathode;
    (b) attaching a fixture to the hub and the cathode, the fixture adapted to hold the cathode within the hub so that there is substantially no contact between the cathode and inner surface of the hub;
    (c) flowing an electrolyte between the cathode and the hub;
    (d) coupling the cathode and the hub to an electrical current supply; and
    (e) passing electrical current between the cathode and the hub to remove material from the inner surface of the hub.

8. A method according to claim 7, wherein step(a) comprises the step of providing a cathode having an electrically conductive substrate with an outer surface that corresponds to the inner surface of the hub, the outer surface comprising a plurality of raised lands corresponding to the grooves to be formed in the hub and a layer of electrically insulating material between the plurality of raised lands.

9. A method according to claim 7, wherein step(e) comprises the step of simultaneously etching grooves in the sleeve and in the thrustplate cavity.

10. A method according to claim 7, wherein step(e) comprises the step of simultaneously forming a fluid dynamic thrust bearing in the thrustplate cavity and at least one fluid dynamic journal bearing in the sleeve.

11. An apparatus for electrochemically etching grooves in an inner surface of an electrically conductive hub, the inner surface having a cylindrical sleeve extending through the hub and a counterbored thrustplate cavity concentric with the sleeve, the apparatus comprising:

(a) a cathode comprising an electrically conductive substrate having an outer surface that corresponds to the inner surface of the hub, the outer surface comprising a plurality of raised lands and a layer of electrically insulating material between the plurality of raised lands;

(b) a fixture adapted to hold the cathode within the hub so that there is substantially no contact between the cathode and inner surface of the hub;

(c) a sealed electrolyte flow-path to flow an electrolyte between the cathode and the hub; and (d) an electrical current supply coupled to the cathode and the hub to pass electrical current therebetween so that material is removed from the inner surface of the hub in areas corresponding to the plurality of raised lands.

12. An apparatus according to claim 11, wherein the plurality of raised lands are arranged on the outer surface of the substrate to simultaneously etch grooves in the sleeve and in the thrustplate cavity.

13. An apparatus according to claim 11, wherein the plurality of raised lands are arranged on the outer surface of the substrate to form a fluid dynamic thrust bearing in the thrustplate cavity and at least one fluid dynamic journal bearing in the sleeve.

14. An apparatus according to claim 11, wherein the plurality of raised lands are shaped and arranged on the outer surface of the substrate to etch a pattern of grooves in the inner surface of the hub, and wherein the pattern is a herringbone pattern or an arcuate pattern.

15. An apparatus for electrochemically etching the grooves in an inner surface of an electrically conductive hub, the inner surface having a cylindrical sleeve extending through the hub and a counterbored thrustplate cavity concentric with the sleeve, the apparatus comprising:

(a) means for flowing an electrolyte over the inner surface of the hub; and (b) means for electrochemically etching grooves in the hub by passing electrical current through the electrolyte and the hub so that material is removed from the inner surface of the hub.

16. An apparatus according to claim 15, wherein the means for electrochemically etching grooves comprises an electrically conductive substrate having an outer surface that corresponds to the inner surface of the hub.

17. An apparatus according to claim 16, wherein the outer surface comprises a plurality of conducting means for passing electrical current from the substrate through the electrolyte to the hub, the conducting means juxtaposed to areas of the inner surface of the hub in which the grooves are to be formed.

18. An apparatus according to claim 17, wherein the outer surface further comprises an electrically insulating means for substantially preventing electrical current from passing from the substrate through the electrolyte to the inner surface of the hub in areas other than those in which the grooves are to be formed.

19. An apparatus according to claim 16, wherein the means for holding the hub comprises an electrically insulating body, and wherein the electrically insulating body is adapted to hold the substrate within the hub so that there is substantially no contact between the substrate and the hub.

* * * * *